(12) United States Patent
Broumas (10) Patent No.: US 10,749,690 B2
(45) Date of Patent: Aug. 18, 2020

(54) SYSTEM AND METHOD FOR CERTIFICATE AUTHORITY FOR CERTIFYING ACCESSORS

(71) Applicant: Samsung Electronics, Co. Ltd., Suwon Si, Gyeonggi-Do (KR)

(72) Inventor: Antonios Dimitrios Broumas, Oakland, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 179 days.

(21) Appl. No.: 15/858,820

(22) Filed: Dec. 29, 2017

(65) Prior Publication Data

US 2018/0262344 A1    Sep. 13, 2018

Related U.S. Application Data

(60) Provisional application No. 62/470,082, filed on Mar. 10, 2017.

(51) Int. Cl.
| | |
|---|---|
| *H04L 29/06* | (2006.01) |
| *H04L 9/32* | (2006.01) |
| *H04L 9/14* | (2006.01) |
| *H04L 9/00* | (2006.01) |
| *H04L 9/30* | (2006.01) |

(52) U.S. Cl.
CPC ............ *H04L 9/3263* (2013.01); *H04L 9/006* (2013.01); *H04L 9/14* (2013.01); *H04L 9/30* (2013.01); *H04L 9/3247* (2013.01)

(58) Field of Classification Search
None
See application file for complete search history.

(56) References Cited

U.S. PATENT DOCUMENTS

| | | |
|---|---|---|
| 5,978,484 A | 11/1999 | Apperson et al. |
| 8,423,612 B2 | 4/2013 | Chen et al. |
| 8,898,459 B2 | 11/2014 | Chawla et al. |
| 9,525,692 B2 | 12/2016 | Gaudet et al. |
| 9,582,267 B2 | 2/2017 | Aabye et al. |
| 2004/0039924 A1* | 2/2004 | Baldwin ............... G06F 21/53 713/189 |
| 2006/0026667 A1 | 2/2006 | Bhide et al. |

(Continued)

OTHER PUBLICATIONS

International Search Report dated Jun. 14, 2018 in connection with International Patent Application No. PCT/KR2018/002787.

(Continued)

*Primary Examiner* — Andrew J Steinle (57) ABSTRACT

A method for access control on an electronic device includes the step of generating, by an electronic device, a certificate signed by a keymaster, the electronic device running an operating system, the operating system capable of distinguishing between applications and application processes and providing an execution environment. The method also includes the steps of indicating, by the certificate, an access privilege for an approved accessor and receiving from an application, a request subject to the access privilege indicated by the certificate. The method further includes the steps of identifying the application from which the request subject to the access privilege was received and determining, using the certificate, whether the application is an approved accessor.

15 Claims, 8 Drawing Sheets

(56) References Cited

U.S. PATENT DOCUMENTS

| | | |
|---|---|---|
| 2008/0168162 A1 | 7/2008 | Chen et al. |
| 2013/0054962 A1* | 2/2013 | Chawla .................. H04L 9/321 |
| | | 713/156 |
| 2013/0268997 A1 | 10/2013 | Clancy, III et al. |
| 2015/0089216 A1* | 3/2015 | Benoit .................. H04W 12/06 |
| | | 713/156 |
| 2015/0270960 A1* | 9/2015 | Ponsini .................. G06F 21/62 |
| | | 713/189 |
| 2016/0028701 A1* | 1/2016 | Hua .................... H04L 63/0471 |
| | | 713/151 |
| 2016/0191236 A1 | 6/2016 | Smirnoff et al. |
| 2016/0285875 A1 | 9/2016 | Lenz et al. |
| 2017/0048215 A1 | 2/2017 | Straub |

OTHER PUBLICATIONS

Written Opinion of the International Searching Authority dated Jun. 14, 2018 in connection with International Patent Application No. PCT/KR2018/002787.

Supplementary European Search Report dated Nov. 28, 2019 in connection with European Patent Application No. 18 76 3836, 7 pages.

* cited by examiner

SYSTEM AND METHOD FOR CERTIFICATE AUTHORITY FOR CERTIFYING ACCESSORS

CROSS-REFERENCE TO RELATED APPLICATION AND CLAIM OF PRIORITY

This application claims priority under 35 U.S.C. § 119(e) to U.S. Provisional Patent Application No. 62/470,082 filed on Mar. 10, 2017. The above-identified provisional patent application is hereby incorporated by reference in its entirety.

TECHNICAL FIELD

This disclosure relates generally to systems, methods and apparatus for implementing access controls on an electronic device. More specifically, this disclosure relates to a system and method for a certificate authority for certifying accessors.

BACKGROUND

As malicious attacks on electronic devices and networks grow in frequency and sophistication, an entity, such as a device, may be required to authenticate itself using its cryptographic certificate showing possession of a private key, along with identifying information, all of which may be signed by a trusted Certificate Authority. Generally, a user (generally understood to be the owner of a device, the device being uniquely distinguishable by an identifier such as a unique serial number, an International Mobile Equipment Identity (IMEI) number or a mobile equipment identifier (MEID) number) is the only one which possesses the private key corresponding to the cryptographic certificate and third parties recognize the user via readable strings embedded in the certificate.

The ability of devices and applications to achieve granularity of access control can be limited in cases where an entity is required to use the same cryptographic certificate across a range of accessing contexts or attempts to enforce access controls utilizing multiple access factors, such as biometric factors (e.g., fingerprint or iris scans). Where a cryptographic certificate only shows a device's possession of a private key associated with a full set of certificate-based access privileges, certificate-based access controls lack granularity and become an "all or none" proposition.

SUMMARY

This disclosure provides a system and method of a certificate authority for certifying accessors.

In a first embodiment, a method for access control on an electronic device includes the step of generating, by an electronic device, a certificate signed by a keymaster, the electronic device running an operating system, the operating system capable of distinguishing between applications and application processes and providing an execution environment. The method also includes the steps of indicating, by the certificate, an access privilege for an approved accessor and receiving from an application, a request subject to the access privilege indicated by the certificate. The method further includes the steps of identifying the application from which the request subject to the access privilege was received and determining, using the certificate, whether the application is an approved accessor.

In a second embodiment, a system includes a processor, and a memory containing instructions causing the processor to run an operating system capable of distinguishing between applications and application processes and providing an execution environment. The non-transitory memory of the system further contains instructions causing the processor to generate a certificate signed by a keymaster, the certificate indicating an access privilege for an approved accessor, to receive from an application, a request subject to the access privilege indicated by the certificate, to identify the application from which the request subject to the access privilege was received and to determine, using the certificate, whether the application is an approved accessor.

In a third embodiment, there is a non-transitory computer-readable medium including program code, which, when executed by a processor, causes a system to generate a certificate signed by a keymaster, the electronic device running an operating system, the operating system capable of distinguishing between applications and application processes and providing an execution environment. The program code, when executed by the processor, further causes the system to indicate, by the certificate, an access privilege for an approved accessor and receive from an application, a request subject to the access privilege indicated by the certificate. The program code, when executed by the processor, further causes the system to identify the application from which the request subject to the access privilege was received and determining, using the certificate, whether the application is an approved accessor.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
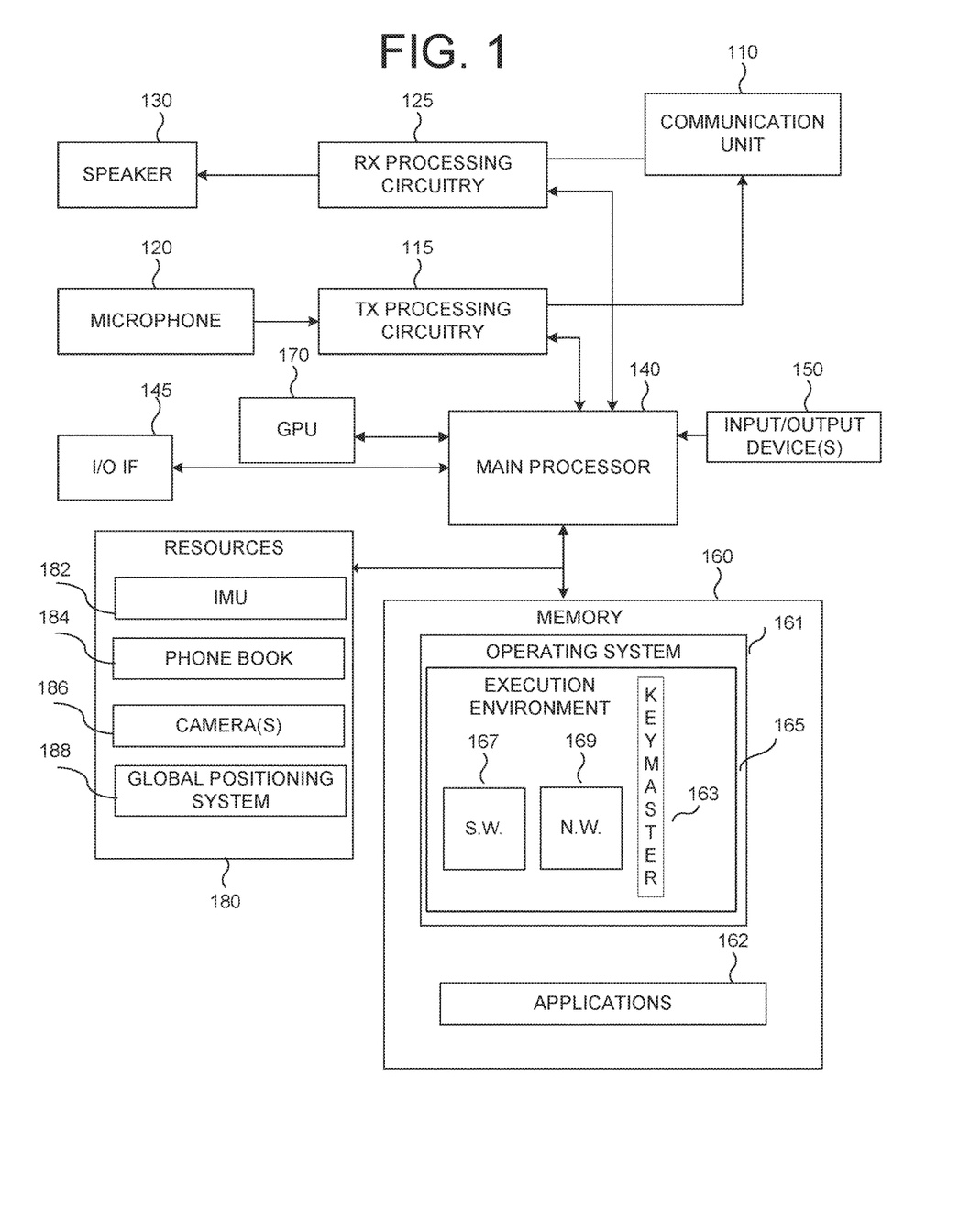
FIG. 1 illustrates an example of an electronic device according to this disclosure.

FIG. 1 illustrates an example of a device for implementing a certificate authority for certifying accessors according to this disclosure. The embodiment of device 100 illustrated in FIG. 1 is for illustration only, and other configurations are possible. However, suitable devices come in a wide variety of configurations, and FIG. 1 does not limit the scope of this disclosure to any particular implementation of a device.

As shown in FIG. 1, the device 100 includes a communication unit 110 that may include, for example, a radio frequency (RF) transceiver, a Bluetooth® transceiver, or a Wi-Fi® transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. Further, applications 162 may include applications containing program code that when executed by a processor, such as main processor 140, cause the processor to perform steps of methods for monitoring suspicious application access according to certain embodiments of the present disclosure.

The communication unit 110 may receive an incoming RF signal, for example, a near field communication signal such as a Bluetooth® or Wi-Fi® signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data).

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

According to some embodiments of this disclosure, operating system 161 is capable of identifying applications and distinguishing between applications application processes at a level sufficient to resolve different accessing contexts at a relatively high level of granularity. For example, according to some embodiments, operating system 161 can distinguish between an email client application and an internet browsing client. Similarly, and by way of illustrative example, operating system 161 can also distinguish between an email client application installed in a business container (such as provided as part of a "Bring Your Own Device" enterprise computing environment) and the same application installed in a personal private usage partition.

Additionally, operating system 161 is capable of providing an execution environment 165 for applications. According to some embodiments, execution environment 165 includes a "secure world" 167 and a "normal world" 169. According to certain embodiments, certain memory and processor resources accessible in "secure world" 167 are not accessible to applications running in "normal world" 169. Further, execution environment 165 can, according to embodiments, include a keymaster 163. Keymaster 163 can be implemented as both hardware or software, and operates to possess a private key of a device signed certificate (DSC) associated with the device. According to certain embodiments, keymaster 163 signs and publishes DSCs and operates as the administrator of a certificate authority (CA) for approved accessors identified by accessor certificates, which according to certain embodiments, comprise DSCs with extensions identifying the approved accessors and specifying the contextual factors of the approved accessors' access permissions. According to certain embodiments, keymaster 163 is device bound and keymaster 163 is provisioned with a private key installed by an original equipment manufacturer (OEM) that has been verified by a special private key associated with the OEM. Further, in some embodiments, the OEM's installation of a private key may further comprise assigning the device a unique identifier, such as an International Mobile Equipment Identity (IMEI) number. According to other embodiments, keymaster 163 is not device bound, but other elements described by the present disclosure, such as accessor certificates, may be device bound.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access according to certain embodiments of the present disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, touch screens, mouse(s), track balls or other devices capable of acting as a user interface to allow a user to interact with electronic device 100. In some embodiments, input/output device(s) 150 can include a touch panel, a virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170.

According to certain embodiments, electronic device 100 includes a variety of additional resources 180 which can, if permitted, be accessed by applications 162. According to certain embodiments, resources 180 include an accelerometer or inertial motion unit 182, which can detect movements of the electronic device along one or more degrees of freedom. Additional resources 180 include, in some embodiments, a user's phone book 184, one or more cameras 186 of electronic device 100, and a global positioning system 188.

Although FIG. 1 illustrates one example of a device 100 for implementing monitoring of suspicious application access, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
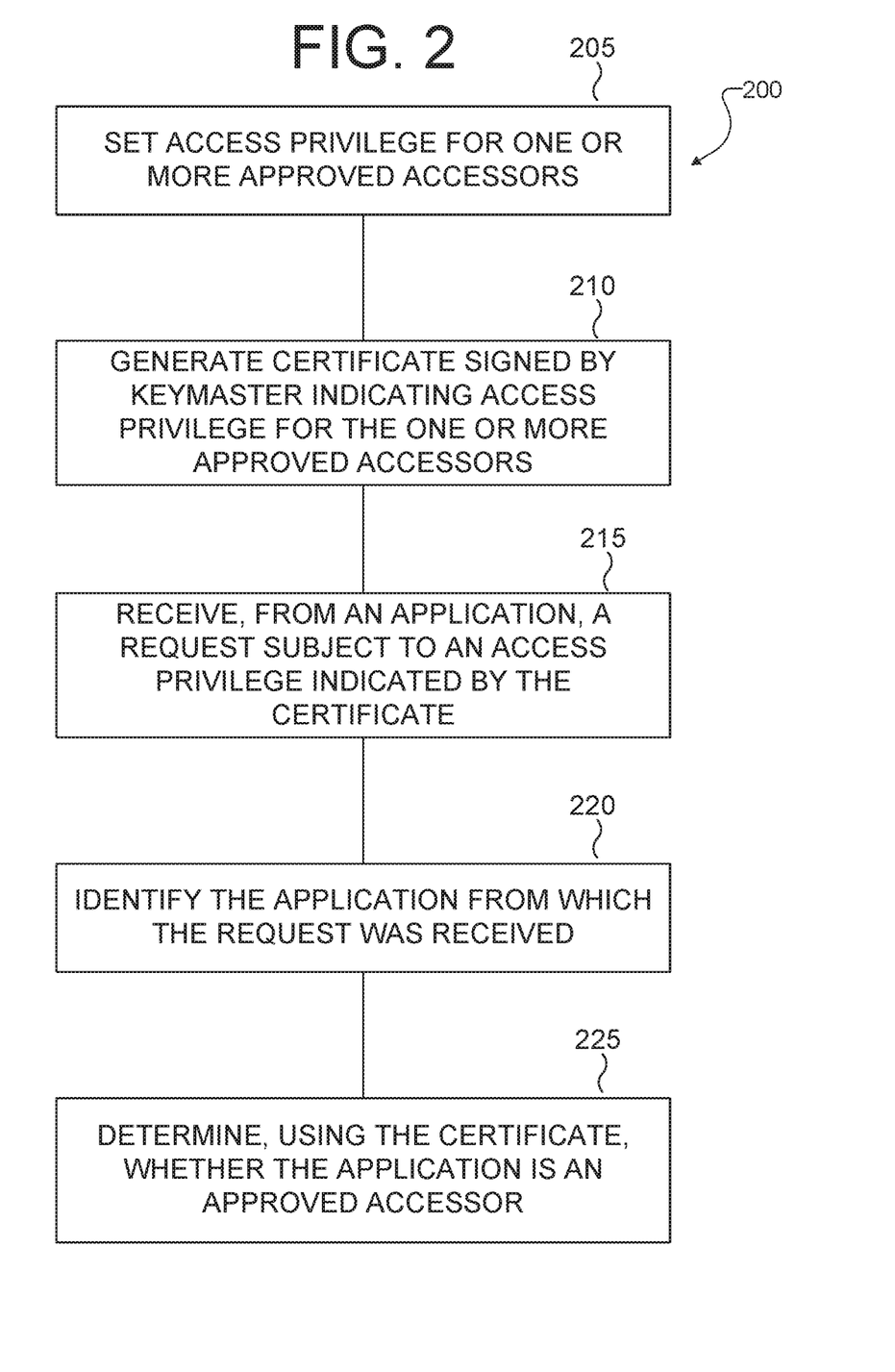
FIG. 2 illustrates operations of an exemplary method for certifying accessors according to this disclosure.

FIG. 2 illustrates operations of an exemplary method for certifying accessors according to this disclosure.

According to certain embodiments, method 200 provides solutions to situations in which fine granularity of access controls for a secure application may be desired or required. Examples of situations where such heightened granularity of access controls is required or useful include secure email applications, where the context of the application's execution or access environment bears significantly on the risk of unwanted access to data. For example, the risks of unwanted access to data associated with an email application installed on and executing as a client application on a device may be different from the risks associated with an email program presented through an internet browser. In the former case, the fact that the email application may have been provided by a recognized and trusted manufacturer may provide useful indicia of trustworthiness not present with the web-based email access.

Improved granularity of access controls may improve the overall operation and security of a networked computer system across a range of contexts. As a further example, it may be desirable for an accounting application installed in a secure enterprise computing container (such as required by a business implementing a "Bring Your Own Device" policy) to have different access controls than a version of the same program installed in a personal private usage partition on the same device. In such cases, the instance of the application in the secure container may be able to access an enterprise's highly sensitive financial data, whereas the instance of the application in the private partition may only be able to access comparatively less sensitive financial data.

As a further example of how the fine granularity of access control which can be provided by certain embodiments of method 200 shown in FIG. 2, consider the case of identically named applications. For example, applications from different vendors can have identical names, such as "PDF Maker." However, one instance of these identically named applications can be associated with more sensitive applications or data (for example, it may be the default .pdf printer for the enterprise financial software described above), while the other instance may be the default .pdf printer for a less sensitive application, such as the software bundled with a document scanner connected to the device.

According to certain embodiments of the present disclosure, method 200 begins at operation 205, where an access privilege for one more approved accessors is set. According to certain embodiments described herein, accessors are computational actors having a unique identifier which can be recognized by the operating system of a device implementing method 200. In some embodiments, an accessor corresponds to a verifiable application running on a device. In certain embodiments, an accessor corresponds to a cryptographically identifiable actor external to a device, such as a different device or an application operating on a different device.

In still other embodiments, an accessor corresponds more generally to a computational process performed by a device. Such a process can be performed as a baseline process of the operating environment provided by an operating system (such as operating system 161 shown in FIG. 1), or one of many processes of an application (such as one of applications 162 shown in FIG. 1). As will be discussed in greater detail herein, according to certain embodiments, an accessor also corresponds to a computational entity which is identified in a cryptographic certificate showing that the accessor is connected, via chain of trust, to a recognized root of trust. According to some embodiments, an accessor is device-bound.

Access privileges can, according to some embodiments, be set at operation 205 through a user interface running on the device, which is configured to receive inputs for adjusting access controls for an accessor according to user selectable criteria corresponding to contextual factors for the access privileges. Such contextual factors include, without limitation, a password, biometric authenticators (for example, fingerprints, voiceprints, iris scan data or other similar identifiers), the data to be exchanged (for example, sending or receiving encrypted data, or signing a digital transaction, such as an online payment), the vendor for the application (for example, instances of applications obtained from the device manufacturer's application store can be set to be trusted more than instances of the same application downloaded elsewhere, or execution environment (for example, access controls for an instance of an application running in a secure container can be set to differ from the access controls for the same application running in a different execution environment).

Alternatively, access privileges can, according to other embodiments, be set by a device or application manager, or the administrator of a network to which the device is connected or the enterprise providing a container in the execution environment of the device.

Next, at operation 210, an accessor certificate indicating an access privilege for the one or more approved accessors is generated by a keymaster.

In some embodiments, the accessor certificate generated at operation 210 can be a Device Signed Certificate (DSC) including extensions specifying the accessors associated with the access privilege. According to certain embodiments, and as will be discussed in greater detail herein, the extensions to the accessor certificate specify contextual factors associated with the approved accessor's access privileges set in operation 205.

The accessor certificate shows the accessor's possession of a private key associated with a specific access privilege; the accessor certificate can be connected by a chain of trust to a device certificate, which can be signed by a unique device root key and an original equipment manufacturer (OEM) root of trust key. Accordingly, the accessor certificate shows an accessor's possession of a private key corresponding to a specific access privilege, and the accessor certificate is connected through a chain of trust to a certificate associated with a full set access privileges for the device, the certificate showing the device's possession of the unique device root key, to the OEM root of trust key.

In some cases, as part of generating the OEM root of trust key, the device can be registered with an offline vetted process associated with mobile device manager provided by a trusted authenticator. According to certain embodiments, the unique device root key and OEM root of trust key can be maintained in a secure part of the device (for example, "secure world" 167 shown in FIG. 1) or in a trusted execution environment provided by the device. Additionally, the accessor certificate and corresponding private key can likewise be maintained in a trusted execution environment. According to certain embodiments, because the accessor certificate is connected by a chain of trust to a verified certificate signed by both the unique device root key and OEM root of trust key, it provides an indication to the outside world that the accessor is a trustworthy possessor and protector of a particular private key, which can be used in a public-private key cryptosystem, such as a Rivest-Shamir-Adleman (RSA) cryptosystem.

Further, because the accessor certificate is connected, by a chain of trust, to a certificate is signed by the unique device root key and the OEM root of trust key, it can be trusted by an external Mobile Device Manager (MDM) or an external certificate authority (CA). Further, the generation of an accessor certificate at operation 210 permits the device to implement a variety of communication and enrollment protocols anchored to the device's trusted possession of a certificate signed by the OEM root of trust key and unique device root key. Such communication and enrollment protocols include, without limitation, Simple Certificate Enrollment Protocol (SCEP), Certificate Management Protocol (CMP), Certificate Management Protocol over Cryptographic-message-syntax and Enrollment over Secure Transport (EST).

According to certain embodiments, the keymaster corresponds to keymaster 163 shown in FIG. 1. Further, in some embodiments, the keymaster is device-bound and contains a private key installed by the OEM.

Next, at operation 215, the device receives, from an application, a request subject to an access privilege indicated by the certificate. According to certain embodiments, the application is one of several trusted applications operating in an execution environment (such as execution environment 162 shown in FIG. 1) of the device. The execution environment can, depending on embodiments, be a trusted execution environment (TEE) or a secure world. As discussed in greater detail herein, the request received at operation 215 can provide sufficient contextual information, such as the application's name, a vendor from which it was downloaded, or a secure container in which it executes, to uniquely identify the application and determine whether it is an approved accessor of a particular access privilege.

Next, at operation 220, the device 220 identifies the application from which a request subject to an access privilege indicated by the certificate was received at operation 215. According to certain embodiments, at operation 220, the device extracts from the request information specifying relevant contextual factors, including, without limitation, the requesting application's name, the developer of the application, the vendor from which the requesting application was obtained, a container in which the application executes, the container registry (if any) associated with the container in which the application executes, and the version number associated with the requesting application. Depending on the granularity of the access controls to be implemented, the identification of the application at operation 220 may involve identifying more or less information corresponding to contextual factors from the request. For example, in cases where extensions to the certificate generated at operation 210 specify that security checks to be performed (such as a biometric check) at the device are required, identification of the application's vendor may be less important, as an iris or fingerprint scan provides the required level of security.

According to certain embodiments, following operation 220, method 200 proceeds to operation 225, wherein the device determines, using the certificate, whether the application is an approved accessor. According to certain embodiments, this determination is performed as a comparison of each of the contextual factors enumerated in the certificate extensions in the certificate indicating the access privileges for approved accessors. For example, a certificate generated at operation 210 specifies that the contextual factors associated with signing access privileges comprise: a.) the application's name; b.) the vendor from which the application was obtained; and c.) a container on the device in which the accessing application executes. In such cases, using logic provided by, for example, an operating system or an application (such as an application among applications 162 shown in FIG. 1) will compare the application name, vendor identity and container information gathered at operation 220 against the values specified certificate, and according to some embodiments, the extensions to the certificate. If each of the identified values for contextual factors a.) through c.) enumerated in the certificate match the values identified from the request, the application is determined to be an approved accessor. In this example, the application would be granted, based on the aforementioned verification of contextual factors, access privileges to sign using the DSC of the device.

Although FIG. 2 illustrates one example of an exemplary method for certifying accessors, various changes may be made to FIG. 2. For example, in some embodiments, instead of generating an accessor certificate as a DSC at operation 210, certain other embodiments can generate a certificate signing request (CSC) having the extensions specifying contextual factors of the access privileges associated with the CSC. Additionally, according to some embodiments, method 200 can further comprise the operation of setting up or configuring an execution environment capable of guaranteeing access control of private keys generated or installed on the device. Further, according to some embodiments, method 200 can be expanded to incorporate generation of a key as an operation of the method. As such, the method can include the step of generating, by the device, pairs of private keys and accessor certificates signed by a device bound keymaster, such that an operating system of the device capable of distinguishing, via cryptographic criteria enforced during installation and runtime, between applications and flavors of application processes that may request private key usage. According to still further embodiments, method 200 may include as operations, indicating, by the contents of the accessor certificates, to consumers of security authentications, a conditional access privilege for an approved accessor. According to some embodiments, method 200 comprises an operation of identifying the exact flavor of application presenting a request subject to an access privilege, determining whether the application is an approved accessor based on a combination of discriminants including, without limitation, the application's version, developer, vendor, container and the container registry associated with the container.

Figure 3:
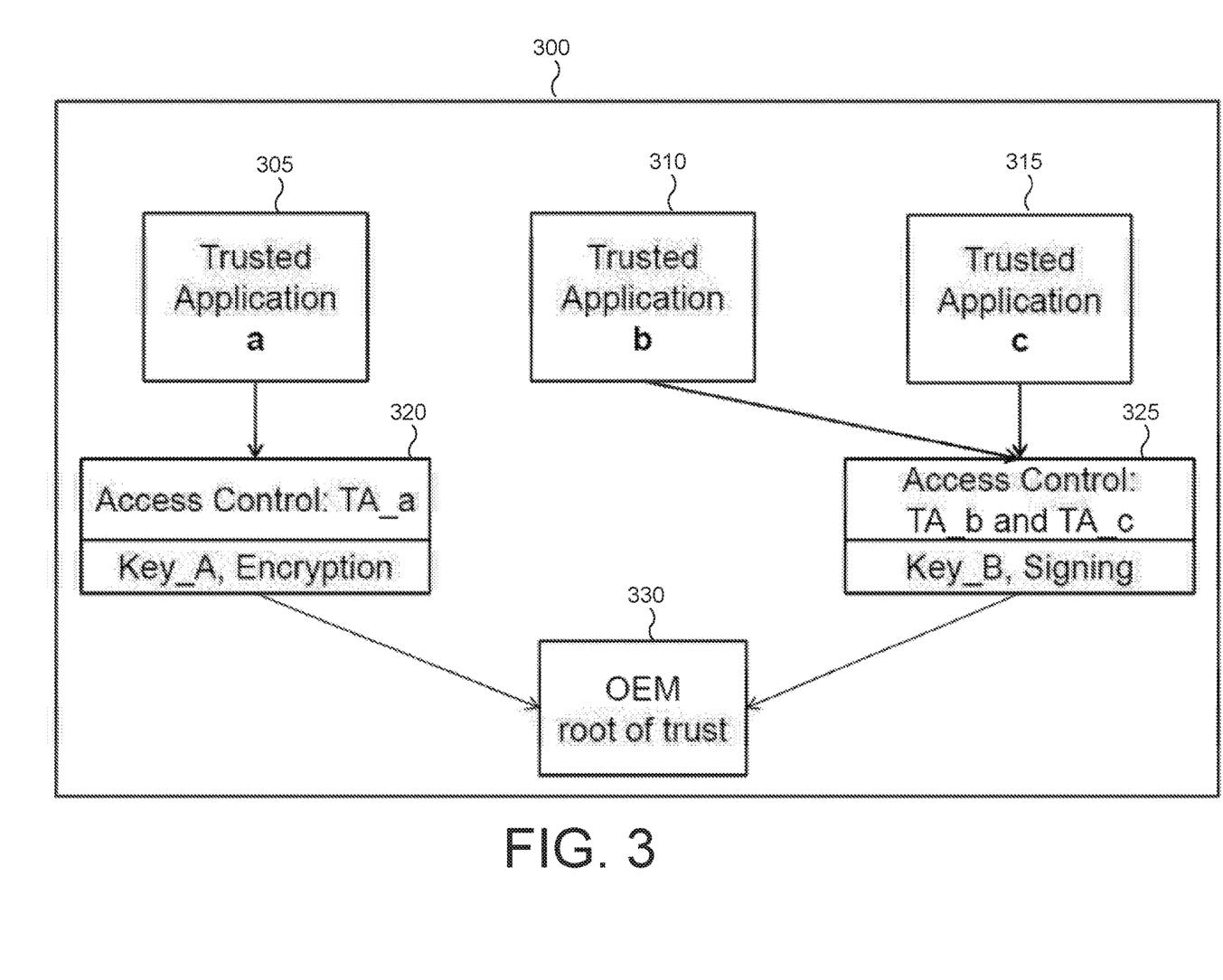
FIG. 3 illustrates aspects of an example of multiple applications operating in a trusted execution environment according to this disclosure.

FIG. 3 illustrates aspects of an example of multiple applications operating in a trusted execution environment (TEE) 300. In the example of FIG. 3, three trusted applications, shown as "Trusted Application a" 305, "Trusted Application b" 310 and "Trusted Application c" 315, are operating within TEE 300. In the nonlimiting example of FIG. 3, each of applications 305, 310 and 315 performs operations with one or more external actors which require the external actor to make a trust decision, based on a certificate associated with the device (such as a DSC or CSR) regarding the device running each of applications 305, 310 and 315. Examples of trust-based transactions between applications 305, 310 and 315 and external actors include, without limitation, confirming an application's identity before releasing data, authorizing transactions, generating public-private key pairs, and encrypting and decrypting data.

In the non-limiting example of FIG. 3, two accessor certificates (first certificate 320 and second certificate 325) according to embodiments of the present disclosure are shown. As shown in FIG. 3, first certificate 320 and second certificate 325 are connected by a chain of trust to certificate 330 which, according to embodiments, is signed by a unique device root key and the device's manufacturer's root of trust key ("OEM root of trust"). According to embodiments, certificate 330 is published by the device and used by external actors as evidence of the device's identity and trustworthiness.

According to some embodiments as shown in FIG. 3, rather than using certificate 330 as cryptographic evidence of the device's possession of the OEM root of trust and device root keys in all trust-based transactions between applications 305, 310 and 315, a keymaster (such as keymaster 163 shown in FIG. 1, which according to certain embodiments, is device-bound) creates and publishes first certificate 320 and second certificate 325 as accessor certificates.

According to embodiments, first certificate 320 and second certificate 325 extend the computational context by which external actors can trust and rely upon certificate 330 to sets of accessors, such as applications 305, 310 and 315. First and second certificates 320 and 325 are connected by chains of trust to certificate 330, and as such, are, like certificate 330, device entrenched and OEM vetted.

In the non-limiting example of FIG. 3, certificate 330 can serve as evidence of the accessor's trusted possession of a private key associated with certain access privileges for certain all trust-based transactions requiring evidence of the accessor's possession of the private key. As such, certificate 330 can be thought of as being associated with the full set of access privileges for the device. According to some embodiments, the full set of access privileges associated with certificate 330 can be subdivided and mapped to sets of accessors and contextual factors to improve the granularity of access controls rooted in certificate 330.

In the non-limiting example of FIG. 3, the access privileges for encryption associated and the access privileges for signing associated with certificate 330 are subdivided, such that the access privileges for encryption are associated with first certificate 320 and the access privileges for signing are associated with second certificate 325. According to certain embodiments, first certificate 320 contains extensions identifying Trusted Application a 305 as an approved accessor with privileges to encrypt data. In this non-limiting example, first certificate 320 provides evidence that the accessor possesses a private key, shown in FIG. 3 as "Key_A." Rather than providing trustworthy evidence that the device possesses the private key associated with certificate 330, first certificate 320 provides evidence that the accessor possesses "Key_A," which represents a private key which can be used for the limited purpose of encryption, but is connected through a chain of trust to certificate 330, which provides trustworthy evidence of the device's possession of a private key associated with the full set of access privileges for the device.

According to certain embodiments, by publishing first certificate 320, the device publicizes evidence of certain accessors' trustworthiness for the purposes of encryption, and informs external processes that the access privileges for encryption have only been extended to Trusted Application a 305. By creating and publishing an accessor certificate, such as first certificate 320, certain embodiments according to this disclosure improve upon and extend the functionality of certificate 330 to provide more granular certificate-based access controls. Put differently, according to certain embodiments, certificate based access controls move beyond being an "all or nothing" proposition.

According to certain embodiments, the full set of access privileges associated with certificate 330 can be further subdivided and associated with other accessor certificates. In the non-limiting example of FIG. 3, the access privileges associated with signing are associated with a second accessor certificate 325. Second certificate 325 identifies Trusted Application b 310 and Trusted Application c 315 as approved accessors and possessors of a private key associated with signing. In addition to naming trusted applications 310 and 315 as accessors, second certificate 325 provides trustworthy evidence that these accessors possess private "Key_B," which represents a private key to be used for the limited purpose of signing. Here, second certificate 325 is connected through a chain of trust to certificate 330, which provides trustworthy evidence of the device's possession of a private key associated with the full set of access privileges for the device.

By parceling out the full set of access privileges associated with certificate 330 between accessor certificates, such as first certificate 320 and second certificate 325, embodiments according to this disclosure not only improve the granularity of certificate-based access controls, but also improve the configurability of the access controls. For example, if a user wishes to assign encryption access privileges to Trusted Application b 310, first certificate 320 can be updated or reissued to include certificate extensions showing Trusted Application b 310 as an approved accessor. Further, the updated or new first certificate 320 can be published, thereby notifying external actors that Trusted Application b 310 has encryption access privileges.

Although FIG. 3 illustrates one example of an exemplary method for certifying accessors, various changes may be made to FIG. 3. For example, FIG. 3 describes each of applications 305, 310 and 315 as operating within TEE 300, TEE 300 is not necessarily required to implement the creation and publication of first certificate 320 and second certificate 325. According to some embodiments, applications 305, 310 and 315 operate in the "secure world" provided by the device's operating system.

Figure 4:
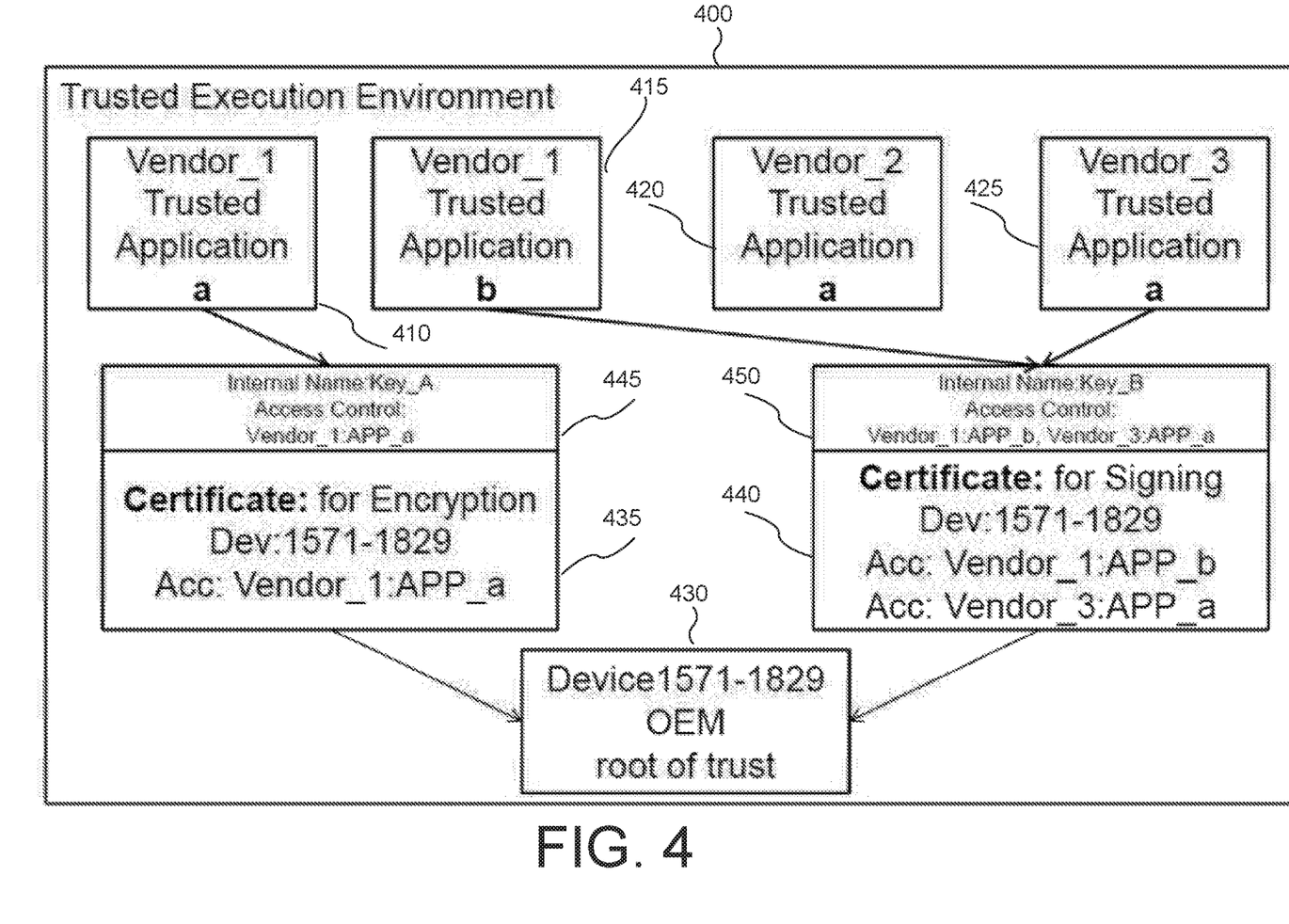
FIG. 4 illustrates an example of applications operating in a trusted execution environment with access privileges mapped to vendors according to this disclosure.

FIG. 4 illustrates aspects of an example of applications operating in a trusted execution environment 400 with access privileges mapped to vendors according to certain embodiments of this disclosure. In the non-limiting example of FIG. 4, four instances (405, 410, 415 and 420) of trusted applications are shown as operating within trusted execution 400. These instances of applications comprise an instance 410 of Trusted Application a from Vendor_1, an instance 415 of Trusted Application b from Vendor_1, an instance 420 of Trusted Application a from Vendor_2, and an instance 425 of Trusted Application a from Vendor_3.

According to certain embodiments, each of Vendor_1, Vendor_2 and Vendor_3 may be understood to not only refer to the seller or distribution origin of an application, but more generally, to the set of attributes that uniquely identify an application, including, without limitation, cryptographic signatures by its developers and distributors, as well as fingerprints or certificate chains connecting an instance of the application to accepted roots of trust.

According to certain embodiments, TEE 400 includes a certificate 430 signed by both the OEM root of trust and a unique device root key. In the non-limiting example of FIG. 4, certificate 430 shows the device's possession of a private key associated with a full set of access privileges associated with certificate 430.

Additionally, according to certain embodiments, TEE 400 further includes a first accessor certificate 435 and a second accessor certificate 440. In the illustrative example of FIG. 4, first accessor certificate 435 is connected by a chain of trust to certificate 430. Further, first accessor certificate 435 can be published by the device, and used by external actors as evidence exhibiting comparable levels of trustworthiness as certificate 430, that certain accessors possess private key 445, which, in this example, has been assigned the internal name "Key_A." In this example, private key 445 is a key specifically associated with encryption. In this non-limiting example, first accessor certificate 435 has been created for the purposes of encryption and restricts access privileges for encryption to instances of Trusted Application a from Vendor_1. In this example, only instance 410 of Trusted Application 1 satisfies the contextual requirements associated with access privileges for encryption. Instance 420 of Trusted Application 1, which is shown as coming from Vendor_2 does not have access privileges for encryption. Thus, certain embodiments according to this disclosure may be used to implement highly granular certificate-based access controls.

In the non-limiting example of FIG. 4, TEE 400 also includes a second accessor certificate 440, which is connected by a chain of trust to certificate 430. According to certain embodiments, second accessor certificate can be published by the device, and used by external actors as evidence having equivalent guarantees of trustworthiness as certificate 430, that certain accessors possess private key 450, which in this example, has been assigned the internal name "Key_B." In this illustrative example, private key 450 is a key specifically associated with signing. In this non-limiting example, second accessor certificate 440 has been created for the purposes of signing and restricts access privileges for signing to instances of Trusted Application b from Vendor_1, and Trusted Application a from Vendor_3. According to certain embodiments, that access privileges are restricted as described above can be indicated by extensions to the certificate, which in certain embodiments comprise strings embedded in the certificate. In this example, only instance 415 of Trusted Application b and instance 425 of Trusted Application a have the contextual factors required by certificate 430.

According to certain embodiments, additional private keys and accessor certificates are created to manage accessors' access privileges and the purposes of accessors' access. Additionally, accessor certificates 435 and 440 can be published by the device to facilitate external awareness of the accessors' access privileges and to accommodate a variety of usage scenarios.

Although FIG. 4 illustrates one example of an exemplary method for certifying accessors, various changes may be made to FIG. 4. For example, TEE 400 can, according to certain embodiments, be dispensed with, and each of instances of applications 410, 415, 420 and 425 can execute in a "secure world" execution environment provided by the device's operating system. Additionally, according to certain embodiments, the vendor information contained in first certificate 435 and second certificate 440 can be implemented as a cryptographically identifiable entity (such as a public key infrastructure (PKI) identifiable string) and attribute encapsulating the developer, distributor and/or version of an application.

Figure 5:
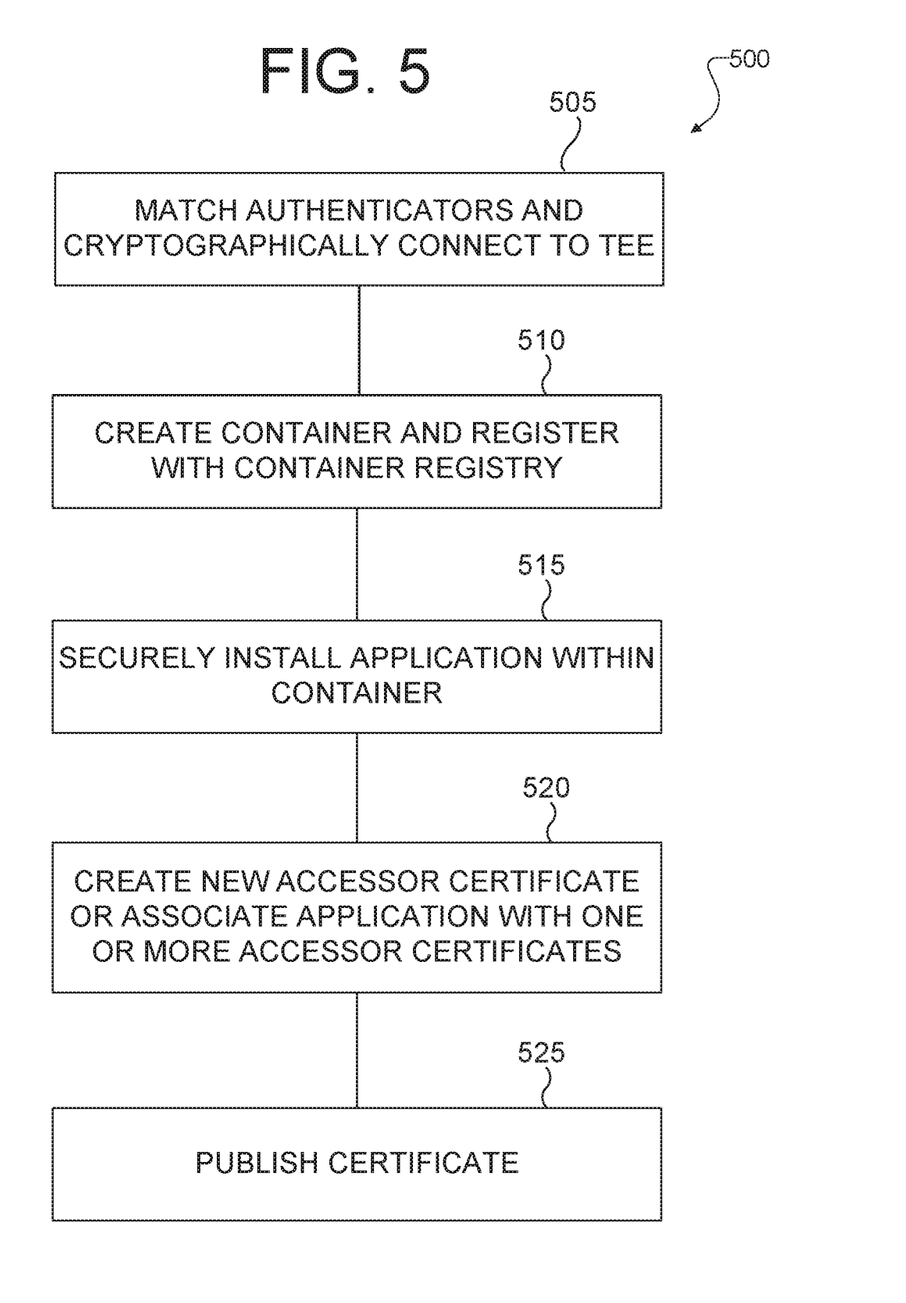
FIG. 5 illustrates operations of an exemplary method for linking accessor certificates with applications according to this disclosure

FIG. 5 illustrates operations of a method 500 for linking accessor certificates with applications according to this disclosure.

According to certain embodiments, method 500 is performed during initial setup of a device or after a factory reset. In some embodiments, method 500 begins at operation 505, during which authenticators are matched and cryptographically connected with a TEE (such as TEE 400 shown in FIG. 4). In the non-limiting example of FIG. 5, authenticators comprise security features, such as a password, fingerprint scan or iris scan for providing additional security to an access privilege by authenticating the identity of a user. For example, at operation 500, the device can, as part of an initialization or setup procedure, request and store a user's fingerprint or iris scan data. According to some embodiments, after receiving data matched with authenticators, the device can cryptographically connect with a trusted execution environment. According to certain embodiments, the trusted execution environment can comprise an environment controlled remotely by an OEM or third party.

In the non-limiting example of FIG. 5, method 500 then proceeds to operation 510, wherein either the device or a third party controlling a trusted execution environment creates a container and registers the container with a container registry. Depending on embodiments, the container registry can be cloud based or controlled by an OEM or other third parties. According to certain embodiments, the container registry can act as a nomenclature broker for instances of trusted applications operating in the created containers, ensuring that each instance of a trusted application is registered under a uniquely recognizable name, and can be mapped, as a unique accessor to a set of access privileges. According to some embodiments, the containers created at operation 510 comprise externally managed execution environments for instances of applications. As discussed herein, examples of containers include containers for running a corporation's enterprise software with access to the corporation's sensitive information.

Next, at operation 515, an instance of at least one application is securely installed within the container created and registered at operation 510. According to some embodiments, to ensure the security of the installation, the application is securely installed by the device's OEM, or an actor verified by the OEM and/or cloud registry.

According to certain embodiments, method 500 then proceeds to operation 520, an accessor certificate (such as first certificate 435 shown in FIG. 4) for the application installed at operation 515 is created. According to certain embodiments, the accessor certificate is connected via a chain of trust to a certificate (such as certificate 330 shown in FIG. 3) which is signed by the OEM's root of trust and a unique device root key. Further, the certificate created at operation 520 provides trustworthy evidence to external actors of the accessor's possession of a private key associated with some subset (such as encryption or signing privileges) of the access privileges associated with the certificate signed by the OEM root of trust key and the unique device root key. Further, according to certain embodiments, the certificate generated at operation 520 contains extensions identifying the application installed at operation 515 as an approved accessor. Additionally, the extensions contained in the certificate can identify the approved accessor by additional attributes, such as the identity of the container in which it was installed, the vendor or distribution origin of the application to ensure that his instance of the application is mapped to a unique identifier. Further, according to certain embodiments, the certificate extensions further specify one or more authenticators which must be matched before enabling the access privilege. According to some embodiments, the authenticator specified in the accessor certificate is an authenticator matched at operation 505.

Alternatively, according to other embodiments, instead of creating a new accessor certificate at operation 520, an existing accessor certificate is updated to specify the application as an approved accessor. Further, an existing accessor certificate can, at operation 520 be updated to specify one or more authenticators as a contextual factor associated with the access privilege.

In some embodiments, at operation 525, the accessor certificate created or updated at operation 520 is published; thereby apprising external actors of the contextual factors (for example, authenticators) associated with the application's access privileges.

According to certain embodiments, once method 500 has been completed, a normal world application triggers an application within a container with a request, such as signing a file with a private key. If the unique identification for the secure application is recognized by the certificate, the request may be granted only after a user interacts with the secure application within the container and provides the requested security verification.

Although FIG. 5 illustrates one example of an exemplary method for linking accessor certificates with applications, various changes may be made to FIG. 5. For example, the application installed at operation 515 can control whether a new accessor certificate is generated or an existing accessor certificate is updated.

Figure 6:
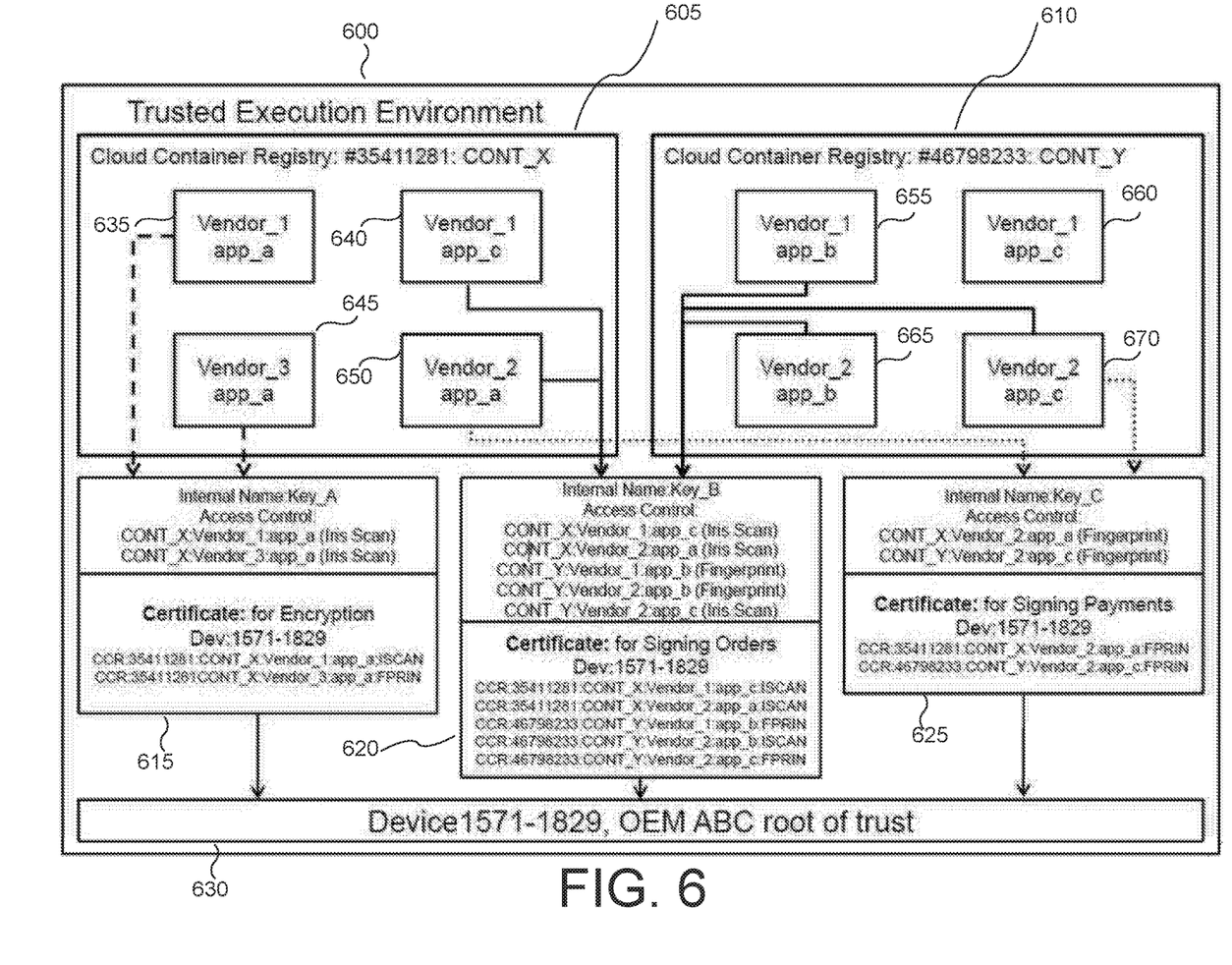
FIG. 6 illustrates an example of applications operating in a trusted execution environment which includes containers and accessor certificates specifying authenticators according to this disclosure.

FIG. 6 illustrates an example of applications operating in a trusted execution environment which includes containers and accessor certificates specifying authenticators according to this disclosure.

In the non-limiting example of FIG. 6, a trusted execution environment (TEE) 600 includes first container 605 and second container 610, which, according to embodiments, are containers created and registered by a container registry (such as by container creation operation 510 shown in FIG. 5). To help ensure that instances of applications operating within TEE 600 are uniquely identifiable, first container 605 and second container 610 may be assigned a unique container name. For example, first container 605 is shown as having been assigned the name "35411281: CONT_X" and second container 610 is shown as having been assigned the name "46798233: CONT_Y."

According to some embodiments, the container registry can be a universal, cloud-based container registry in communicative contact with TEE 600. Further, the universal cloud container registry can vet and publish the assigned names of first container 605 and second container 610. In so doing, the cloud container registry can relieve the problems of naming conflicts and lax security, which may arise when device owners or administrators have free rein to assign container names. Further, to enhance security, the cloud container registry can embed cryptographically important numbers, which can serve as a "fingerprint" for accessor certificates associated with the container. In the non-limiting example of FIG. 6, the number "35411281" in the name of first container 605 may, for example, be replaced with the product of two large primes, or the modulus thereof.

In the non-limiting example of FIG. 6, four instances of trusted applications are shown as running in first container 605, including an instance 635 of App_A from Vendor_1, an instance 640 of App_C from Vendor_1, an instance of App_A from Vendor_3, and an instance 650 of App_A from Vendor_2. Additionally, four instances of trusted applications are shown as running in second container 610, including an instance 655 of App_B from Vendor_1, an instance 660 of App_C from Vendor_1, an instance 665 of App_B from Vendor_2, and an instance 670 of App_C from Vendor_2.

According to embodiments, TEE 600 further comprises first accessor certificate 615, second accessor certificate 620 and third accessor certificate 625. Each of accessor certificates can be connected, via a chain of trust to a certificate 630 signed by the OEM root of trust or a device root key. Additionally, each of accessor certificates 615, 620 and 625 operates as trustworthy evidence of accessors' possession of a private key corresponding to some portion of the universe of access privileges associated with certificate 630. For example, first accessor certificate 615 shows certain accessors' possession of a private key associated with access privileges for encryption. Second accessor certificate 620 shows certain accessors' possession of a private key associated with access privileges for signing orders. Third accessor certificate 625 shows certain accessors' possession of a private key associated with access privileges. According to certain embodiments, each of certificates 615, 620 and 625 is bound to the device, and contains an identifier of the device to which they are bound. For example, certificate 615 is shown as including the device identifier "1571-1829" associated with the device on which it executes. Further, in the non-limiting example of FIG. 6, certificate 630, which is signed by the OEM root of trust or a device key, also contains the device identifier "1571-1829," which, depending on embodiments, may have been installed by the device manufacturer. According to certain other embodiments, certificate 615 may not be device bound, but instead bound to a specific application executing on the device.

Additionally, according to the non-limiting example of FIG. 6, each accessor certificate includes extensions mapping an instance of a trusted application (identified by a unique identifier) to an access privilege and the authenticators specifically designated for that instance of the application. For example, the certificate extension "CCR: 35411281:Cont_X_Vendor_2:app_a:FPRIN" included in third certificate 625 specifically maps instance 650 of App_A, uniquely identified by a combination of first container 605's unique identifier "35411281" and "Vendor_1" to access privileges for signing payments. Further, according to embodiments, instance 650's payment signing privileges to authentication based on a match with a registered fingerprint, as shown by the string "FPRIN."

According to embodiments, an instance of an application is specified in multiple accessor certificates and designated as an approved accessor to multiple access privileges. For example, instance 670 of App_C is identified in third accessor certificate 625 as an approved accessor for signing payments through the extension "CCR: 46798233:CONT_Y:Vendor_2:app_c:FPRIN", and in second accessor certificate 620 as an approved accessor for signing orders, as shown by the extension "CCR: 46798233:CONT_Y:Vendor_2:app_c:FPRIN."

Although FIG. 6 illustrates one example of applications operating in a trusted execution environment which includes containers and accessor certificates specifying authenticators according to this disclosure, various changes may be made to FIG. 6. For example, in cases where an instance of an application, such as instance 670 of App_C is through multiple accessor certificates to multiple access privileges, the authenticators specified by the accessor certificates may be different. Thus, according to certain embodiments, instance 670 of App_C specify a fingerprint as the authenticator for signing orders and an iris scan as the authenticator for signing payments. Alternatively, no authenticator may be required for singing payments. Numerous variations are possible.

Figure 7:
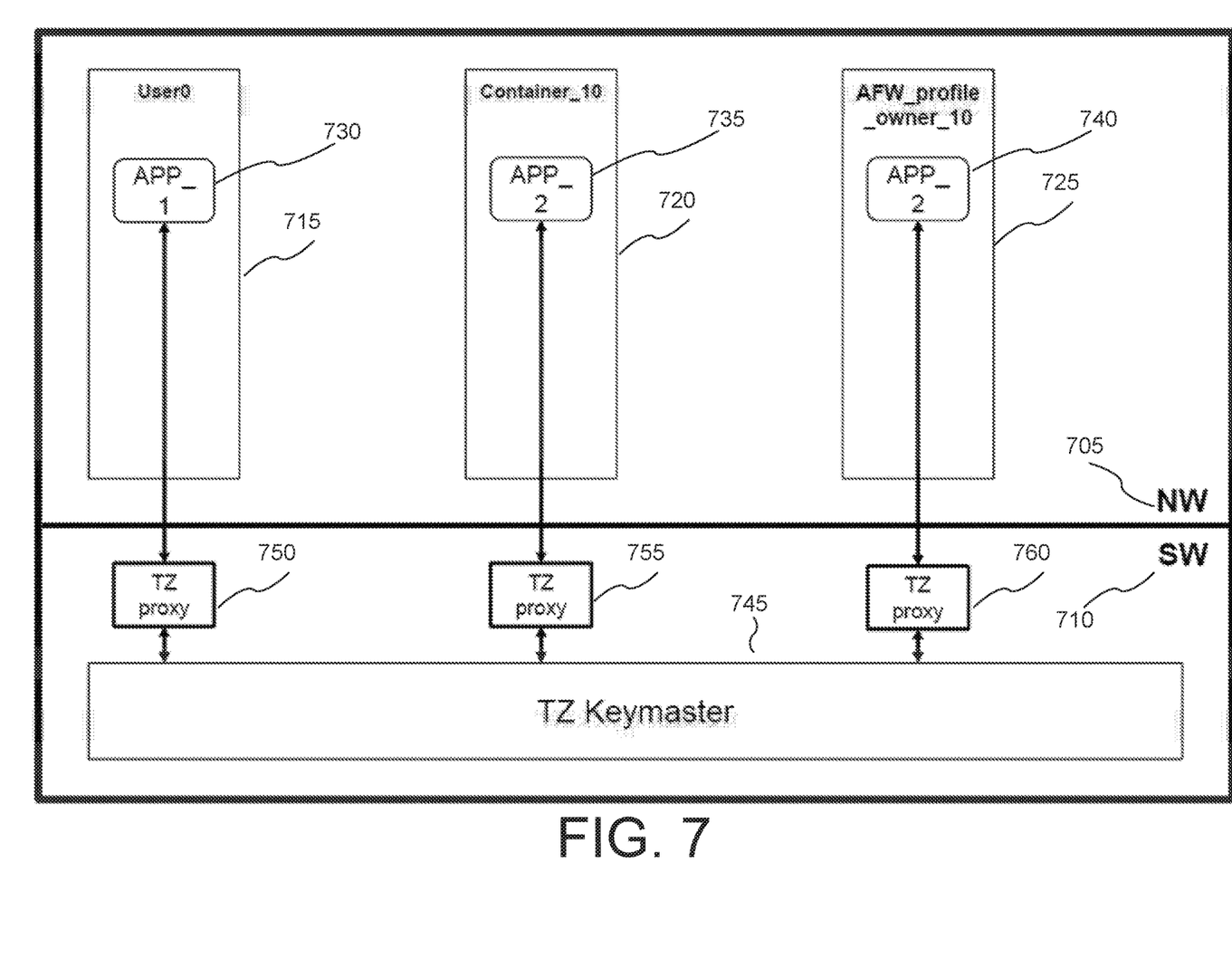
FIG. 7 illustrates an example of an implementation of accessor certificates for accessors executing in a "normal world" execution environment.

FIG. 7 illustrates an example of an implementation of accessor certificates for accessor applications executing in a "normal world" execution environment according to embodiments of this disclosure.

Depending on the operating system of the device used to implement the systems and methods of this disclosure, it may be desirable or necessary for accessors to be executing in an execution environment other than a TEE or the "secure world" provided by a device's operating system.

In the non-limiting example of FIG. 7, an execution environment comprising a "normal world" 705 and a "secure world" 710 is shown. Further, according to this illustrative example, secure world 710 further comprises a container 715 named "User0," a container 720 named "Container 10," and a container 725 named "AFW_profile_owner_10." According to some embodiments, each of containers 715, 720 and 725 can be given user-defined names. However, according to other embodiments, each of containers 715, 720 and 725 could be assigned names and managed by a nomenclature manager, such as the cloud container registry described herein with reference to FIG. 6.

According to some embodiments, each of the containers in the normal world 705 contains an instance of an application that is an approved accessor of an access privilege premised on the accessor's provision of evidence that it possesses a trustworthy private key associated with the access privilege, the private key connected by a chain of trust to a private key signed by the OEM key and the device root key. In the illustrative example of FIG. 7, an instance 730 of "App_1" is shown as executing within container 715. A first instance 735 of "App_2" is shown as operating within container 720, and a second instance 740 of "App_2" is shown as operating within container 725.

According to certain embodiments, it may be advantageous, from a security or configuration standpoint, to maintain the private key associated with the access privileges with a keymaster 745 within "secure world" 710, which, in this particular example, is a device bound keymaster. In such embodiments, because applications 730, 735 and 740 execute in "normal world" 705, they may not be able to access memory resources and processes within "secure world" 710 where the private keys associated with their access privileges are maintained. Further, because applications 730, 735 and 740 execute within "normal world" 705, they may likewise may not be able to obtain and issue accessor certificates.

According to some embodiments, a bridge between approved accessors 730, 735 and 740 executing in "normal world" 705, and the private keys and "secure world" facilities (for example, keymaster 745) for providing evidence of their trustworthiness as approved accessors (e.g., generating and managing accessor certificates) can be provided by one or more proxy applications 750, 755 and 760.

In the non-limiting example of FIG. 7, each of proxy applications 750, 755 and 760 executes within the "secure world" and operates to manage the accessor privileges of applications 730, 735 and 740, and to service requests for accessor certificate requests associated with applications 730, 735 and 740. In this way, the "normal world" applications are paired with the "secure world" keymaster such that the security of accessor certificates and private keys associated with the access privileges of applications 730, 735 and 740 can be maintained in the "secure world," while, at the same time, avoiding any need to reconfigure or reinstall applications executing in "normal world" 705.

Figure 8:
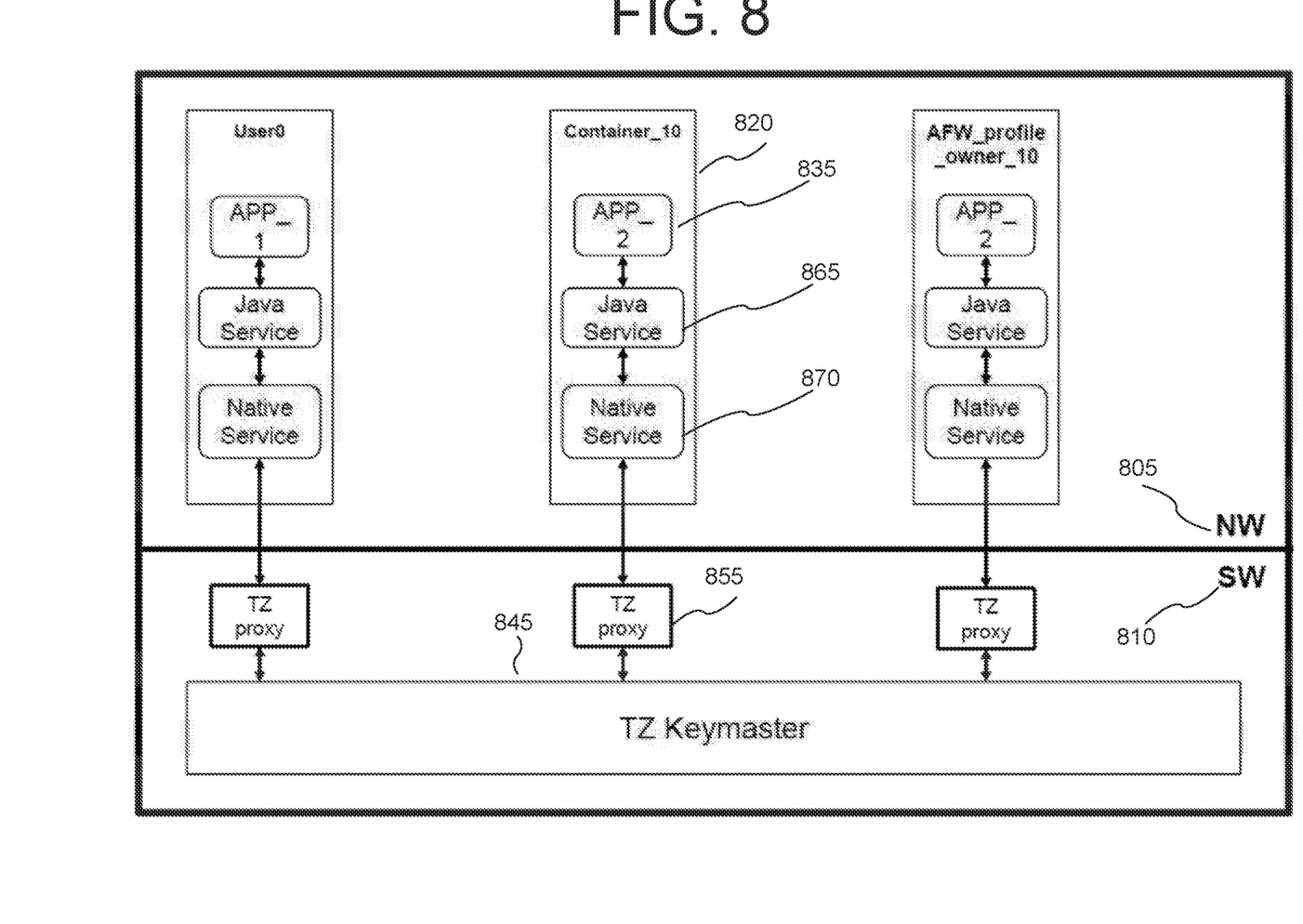
FIG. 8 illustrates a further example of an implementation of accessor certificates for accessors executing in a "normal world" execution environment.

FIG. 8 illustrates a further example of an implementation of accessor certificates for accessor applications executing in a "normal world" execution environment.

According to certain embodiments, an execution environment comprises a "normal world" 805 and a "secure world" 810, wherein "secure world" 810 comprises computing resources, such as memory locations and processes, not available to applications executing in "normal world" 805.

In the non-limiting example of FIG. 8, "secure world" 810 comprises a keymaster 845 for issuing and managing accessor certificates according to embodiments of the present disclosure. Further, "secure world" 810 comprises one or more proxy applications 855 interfacing between keymaster 845 and approved accessors executing in "normal world" 805 to provide access controls using accessor certificates.

In this illustrative example, approved accessors executing in "normal world" 805 include an instance 835 of "App_2" executing in a container 820 named "Container 10." While in this illustrative example, the names of instance 835 of "App_2" and "Container 10" can be user-defined, other embodiments, in which the nomenclature for container 820 and application 835 are assigned by an external entity, such as a cloud container registry are possible. According to such embodiments, there may be higher assurances of uniqueness across container, application and version names, improving the granularity and reliability of accessor certificate based access controls.

According to certain embodiments, the operating system of the device providing an execution environment having "native world" 805 and "secure world" 810 may be such that proxy 855 cannot communicate directly with instance 835 of "App_2." According to such embodiments, an inter-process communication mechanism (such as a binder) can be used for proxy 855 to provide approved accessor 835 with an accessor certificate. According to certain embodiments, such an inter-process communication mechanism can be provided by a JAVA service 865 interfacing with instance 835 of "App_2," as well as a native service 870. Further, native service 870 can interface with both JAVA service 865 and proxy 855.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for access control on an electronic device comprising:
   generating, by an electronic device, a certificate signed by a keymaster, the electronic device running an operating system, the operating system capable of distinguishing between applications and application processes and providing an execution environment;
   implementing, by the electronic device, a trusted execution environment in the execution environment, wherein the keymaster is device bound and executes within the trusted execution environment;
   indicating, by the certificate, an access privilege for an approved accessor;
   receiving from an application, a request subject to the access privilege indicated by the certificate;
   identifying the application from which the request subject to the access privilege was received; and
   determining, using the certificate, whether the application is an approved accessor,
   wherein the certificate comprises container identifications.

2. The method of claim 1, wherein the certificate is signed by a unique device root key for the electronic device.

3. The method of claim 2, wherein the certificate is further signed by a root of trust key for the electronic device.

4. The method of claim 1, further comprising utilizing a trusted execution environment proxy to pair an application within the trusted execution environment with another application residing outside the trusted execution environment.

5. The method of claim 1, wherein the electronic device retrieves the container identifications from a cloud container registry.

6. The method of claim 1, wherein the certificate further includes an accessor's distribution origin.

7. A system for providing access control on an electronic device comprising:
   a processor; and
   a memory containing instructions causing the processor to:
      run an operating system capable of distinguishing between applications and application processes and providing an execution environment,
      implement a trusted execution environment in the execution environment, wherein a keymaster is device bound and executes within the trusted execution environment,
      generate, a certificate signed by the keymaster, the certificate indicating an access privilege for an approved accessor,
      receive from an application, a request subject to the access privilege indicated by the certificate,
      identify the application from which the request subject to the access privilege was received, and
      determine, using the certificate, whether the application is an approved accessor, wherein the certificate comprises container identifications.

8. The system of claim 7, wherein the certificate is signed by a unique device root key for the electronic device.

9. The system of claim 8, wherein the certificate is further signed by a root of trust key for the electronic device.

10. The system of claim 7, wherein the trusted execution environment further comprises a proxy to pair an application within the trusted execution environment with another application residing outside the trusted execution environment.

11. The system of claim 7, wherein the memory contains instructions causing the processor to retrieve the container identifications from a cloud container registry.

12. The system of claim 7, wherein the certificate further includes an accessor's distribution origin.

13. A non-transitory computer-readable medium including program code, which, when executed by a processor, causes a system to:
- run an operating system capable of distinguishing between applications and application processes and providing an execution environment,
- implement a trusted execution environment in the execution environment, wherein a keymaster is device bound and executes within the trusted execution environment,
- generate, a certificate signed by the keymaster, the certificate indicating an access privilege for an approved accessor,
- receive from an application, a request subject to the access privilege indicated by the certificate,
- identify the application from which the request subject to the access privilege was received, and
- determine, using the certificate, whether the application is an approved accessor, wherein the certificate comprises container identifications.

14. The non-transitory computer-readable medium of claim 13, wherein the certificate is signed by a unique device root key for an electronic device.

15. The non-transitory computer-readable medium of claim 13, wherein the certificate is further signed by a root of trust key for an electronic device.

* * * * *